(12) United States Patent
Tanaka et al.

(10) Patent No.: US 7,332,191 B2
(45) Date of Patent: *Feb. 19, 2008

(54) COMPOSITIONS CONTAINING TOASTED SOYBEAN FLAKES AND POTATO FLAKES

(75) Inventors: Itaru "Terry" Tanaka, West Des Moines, IA (US); Safir Moizuddin, Ames, IA (US)

(73) Assignee: MicroSoy Corporation, Jefferson, IA (US)

( * ) Notice: Subject to any disclaimer, the term of this patent is extended or adjusted under 35 U.S.C. 154(b) by 353 days.

This patent is subject to a terminal disclaimer.

(21) Appl. No.: 10/792,955

(22) Filed: Mar. 4, 2004

(65) Prior Publication Data

US 2004/0197464 A1 Oct. 7, 2004

Related U.S. Application Data

(63) Continuation of application No. 10/382,697, filed on Mar. 6, 2003.

(51) Int. Cl.
*A23L 1/20* (2006.01)
*A23L 1/2165* (2006.01)

(52) U.S. Cl. ...................... 426/634; 426/637

(58) Field of Classification Search ................ 426/634, 426/637
See application file for complete search history.

(56) References Cited

U.S. PATENT DOCUMENTS

| | | | |
|---|---|---|---|
| 3,336,138 A * | 8/1967 | Nakel | 426/537 |
| 3,911,142 A | 10/1975 | Huelskamp | |
| 3,941,890 A | 3/1976 | Drachenberg | |
| 3,950,550 A | 4/1976 | Katayama | |
| 3,971,856 A | 7/1976 | Daftary | |
| 4,005,139 A | 1/1977 | Kortschot | |
| 4,041,187 A | 8/1977 | Nelson | |
| 4,103,034 A | 7/1978 | Ronai | |
| 4,409,256 A | 10/1983 | Johnson | |
| 4,639,216 A | 1/1987 | Schnupp | |
| 4,748,038 A | 5/1988 | Lewis | |
| 4,810,513 A | 3/1989 | Van Liere | |
| 4,895,730 A | 1/1990 | Chikarashi | |
| 4,923,710 A | 5/1990 | Van der Marel | |
| 5,710,365 A | 1/1998 | Kerr | |
| 5,866,192 A | 2/1999 | Uesugi | |
| 5,936,069 A | 8/1999 | Johnson | |
| 6,066,353 A | 5/2000 | Martines-Serna Villagran | |
| 6,177,116 B1 | 1/2001 | Villagran | |
| 6,235,333 B1 | 5/2001 | Martines-Serna Villagran | |
| 6,287,622 B1 | 9/2001 | Martinez-Serna Villagran | |
| 6,291,009 B1 | 9/2001 | Cohen | |
| 6,391,374 B1 | 5/2002 | Gray | |
| 6,426,111 B1 | 7/2002 | Hirsch | |
| 6,479,089 B2 | 11/2002 | Cohen | |
| 6,495,140 B1 | 12/2002 | Collins | |

FOREIGN PATENT DOCUMENTS

| | | |
|---|---|---|
| JP | 53-133657 | 4/1977 |
| JP | 07-227239 | 8/1995 |

OTHER PUBLICATIONS

Soybean Digest—Jun. 1959, vol. 19—5 pages.

* cited by examiner

*Primary Examiner*—Arthur L. Corbin
(74) *Attorney, Agent, or Firm*—Sturm & Fix LLP (57) ABSTRACT

The invention relates to an improved compositions comprising mixtures of toasted soybean flakes and potato flakes, for making highly soy protein enriched and soy oil containing mashed potato products having excellent nutritional, taste and texture properties. The toasted soybean flakes are made from full fat, enzyme active, dehulled soybean flakes. Additionally, the invention relates to methods for making said highly soy protein enriched and soy oil containing mashed potato products from said compositions; and to said highly soy protein enriched and soy oil containing mashed potato products per se.

11 Claims, 1 Drawing Sheet

Fig. 1

COMPOSITIONS CONTAINING TOASTED SOYBEAN FLAKES AND POTATO FLAKES

CROSS REFERENCE TO RELATED APPLICATIONS

This application is a Continuation-in-Part of U.S. patent application Ser. No. 10/382,697, filed Mar. 6, 2003 and entitled COMPOSITION CONTAINING SOYBEAN FLAKES AND POTATO FLAKES, METHOD FOR MAKING A FOOD PRODUCT THEREFROM, AND SAID FOOD PRODUCT, relating to Soybean flakes-Potato flake compositions.

BACKGROUND OF THE INVENTION

1. Field of the Invention

This invention relates to an improved composition comprising a mixture of toasted soybean flakes and potato flakes, for making a highly soy protein enriched and soy oil containing mashed potato product exhibiting excellent nutritional, taste and texture properties. The toasted soybean flakes are prepared from full fat, enzyme active soybean flakes, which are made from dehulled soybeans. The toasted soybean flakes are made by heating the full fat, enzyme active soybean flakes in hot fluidizing gas at a temperature and for a time sufficient to substantially eliminate beany or other off-flavors, without significant denaturing of the soybean protein. The invention further relates to method for making said highly soy protein enriched mashed potato product from said composition; and to said mashed potato product per se. The toasted soybean flakes used in the present invention permit use of soybeans varieties other than the null varieties, especially triple null, which are expensive and generally believed necessary to avoid undesirable beany flavors associated with untoasted flakes.

2. Background and Description of Related Art

Soybeans have long been a staple of the Asian diet in multiple food forms including tofu and soymilk, among many other soy based and fermented foods. Soybeans are excellent sources of protein. Enzyme active soy protein, i.e., soy protein which has not been denatured, has a desirable amino acid profile for nutritional purposes, and includes other health promoting elements such as phytoestrogens. In recent years, demand for soy foods has grown dramatically in the United States and other western countries, principally in the form of meat analogues, nutrition bars and powdered nutrition beverages prepared from soy protein isolates and concentrates. Chemically fractionated soy ingredients and soymilk are prepared by modernized methods to reduce much of the traditional "beany" flavor favored in the East, but severely objected to in the West. Demand for natural and organic foods has grown at an extraordinary rate. Foods designated "natural" and/or "organic" generally cannot utilize chemically processed materials. The soy ingredients commonly used today are not full fat or oil, having been treated with solvents such as hexane to remove fats or oils. The terms "fat" and "oil" are used interchangeably with respect to soybeans in the prior art and in this application. The defatted concentrates or isolates do not qualify as natural or organic, as has been increasingly popular in today's market. U.S. Pat. Nos. 6,495,140 and 6,426,111, for example, illustrate preparation of soy fractionates and/or isolates using solvent extraction.

The soybean flakes useful for making the toasted soybean flakes used in the present invention are made from full fat, enzyme active, dehulled soybeans, such as by the method recited in U.S. Pat. No. 4,895,730. This patent is hereby incorporated herein by reference, and is assigned to MicroSoy Corporation, 300 East MicroSoy Drive, Jefferson, Iowa 50129. Soybean flakes made from full fat, enzyme active, dehulled soybeans, by the method of the '730 patent are called MicroSoy Flakes® and are denoted herein as "MSF" in the COMPARATIVE EXAMPLES and as "MX" in TABLE 1. The soybean flakes used in the present invention qualify as "natural"; and when prepared from soybeans qualifying as organically grown, also qualify as organic foodstuffs.

Full fat, enzyme active (i.e., wherein the proteins are undenatured), dehulled soybeans are excellent sources of elements necessary for good health, and supply outstanding nutritional and nutraceutical benefits. Undenatured soybeans and soybean flakes are excellent sources of protein, iron, vitamin-B, calcium, lecithin and isoflavones. In particular, the lecithin content is from about 2.7 to 3.1 percent. Soybeans also contain essential minerals including phosphorus, which is an essential element used by the body for building bones. Soy isoflavones are now considered helpful in reducing risks for cancer, heart disease, and osteoporosis. Pure soya contains about 38-42% protein, 18-22% fat or oil (of this lecithin is 2.7-3.1%), 25-35% carbohydrate, 1.5-2.5% minerals, 3-5% fiber, and 5-6% water. Full soya flour furnishes about 89 grams of protein per 1000 calories, i.e., about 132 grams of protein and 44 grams oil per 1000 grams. By contrast potatoes contain only about 21 grams of protein per 1,000 calories. In addition, since soybeans do not contain particular glutens, products containing substantial amounts of soybeans offer an alternative for people suffering from celiac disease and/or gluten allergies. Full soya flour contains about three times the grams of protein per 1000 grams as lean beef. A "typical analysis of soy flour and soy grits appears in "*The Soybean Digest*", Vol. 19, No. 8, June 1959, pages 8 to 9, as follows:

|  | Full fat/oil | High fat/oil | Low fat/oil | Defatted |
|---|---|---|---|---|
| Protein, % | 40.0 | 45.0 | 48.0 | 52.0 |
| Fat, % | 20.0 | 15.0 | 5.0 | 0.5 |
| Fiber, % | 2.5 | 2.5 | 3.0 | 3.0 |
| Ash, % | 5.0 | 5.0 | 5.5 | 6.5 |
| Moisture, % | 8.0 | 8.0 | 8.0 | 8.0 |

MicroSoy® full fat, enzyme active soybean flakes contain 40-48% protein, 19.0% fat/oil, 2.1% fiber, 4.79% ash, 8.08% moisture, and 27.59% carbohydrate.

There exists in the prior art need for soy protein enriched products, while maintaining good taste, texture, and processibility in standard food processing equipment. The present inventors and the prior art faced the problem that unfortunately products containing large amounts of soybeans tend to exhibit undesirable taste and/or texture properties. They also faced the problem that amounts of soybean flakes which could be used in various compositions was limited by beany and other objectionable flavors incurred at higher soybean flake concentrations; thus, requiring at higher concentrations the use of expensive triple null variety soybeans. This was especially true of soybean flakes-potato flakes compositions, such as disclosed in parent patent application Ser. No. 10-382,697, where the amount of soybean flakes was limited to 45%, by the occurrence of beany flavors at higher amounts.

U.S. patent application Ser. No. 10-382,697 was filed Mar. 6, 2003 in the names of inventors Itaru Tanaka, Safir Moizuddin, and Bruce Liu; and titled COMPOSITION CONTAINING SOYBEAN FLAKES AND POTATO FLAKES, METHOD FOR MAKING A FOOD PRODUCT THEREFROM, AND SAID FOOD PRODUCT; now pending. This patent application is, of course, incorporated herein by reference.

The present inventors faced the problem that null variety soybeans, especially the expensive triple null, were required at higher soybean flakes concentrations to avoid beany flavors. There was clearly a need for soybean flakes which could be made with a wide range of soybean varieties without incurring objectionable beany flavors. Products containing large amounts of soy materials, in addition to beany flavors, also exhibit unpleasant characteristics including beany flavors, chalkiness and/or mouth dryness, grittiness, grassy flavor, bitter flavor, salty flavor, and astringency. Moreover, the present inventors and the prior art faced the problem that soybeans do not contain certain proteins, such as prolamins, gliadin or glutenin, nor sufficient starches, that provide elasticity, cohesiveness and binding during processing.

U.S. patent application Ser. No. 10/793,238, has been filed on even date herewith in the name of inventors Itaru Tanaka and Safir Moizuddin, and is titled TOASTED SOYBEAN FLAKES AND METHOD OF MAKING SAME, now U.S. Pat. No. 7,169,432. This application is hereby incorporated herein by reference; and will be referred to hereinafter as the "copending 'TOASTED SOYBEAN FLAKES . . . ' application".

The present inventors discovered, as disclosed in detail in the copending "TOASTED SOYBEAN FLAKES . . . " application, a method of preparing toasted soybean flakes which significantly reduces and/or eliminates the beany or off-flavors associated with soy materials, while minimizing denaturing of soy proteins. The inventive toasted flakes are made by heating, in a hot fluidizing gas, fill fat, enzyme active soybean flakes, prepared from dehulled soybeans, to a temperature and for a time sufficient to substantially eliminate objectionable beany and off-flavors, while avoiding denaturing of the soy protein.

The present inventors have discovered that unexpectedly higher amounts of the inventive toasted soybean flakes can be incorporated into soybean flakes-potato flakes compositions useful for making highly soy protein enriched and soy oil containing mashed potato products, while maintaining excellent taste and texture and avoiding objectionable beany flavors. Soybean flakes-potato flake compositions are disclosed in parent U.S. patent application Ser. No. 10-382,697, as limited to a maximum soybean flake content of 45%, without incurring objectionable beany flavors. Use of toasted soybean flakes unexpectedly permits, contrary to the maximum of 45% soybean flakes taught in the '697 application, inclusion of up to 60% toasted soybean flakes, while avoiding beany flavors and retaining excellent flavor and texture. The '697 application teaches that amounts higher than 45%, even with soybean flakes made from triple null soybean varieties, result in undesirable beany flavors and other changes in taste and texture. The inventive toasted soybean flakes permit use of soybeans varieties other than the null varieties, especially triple null, which are expensive and usually thought to be required to avoid undesirable beany flavors associated with use of untoasted flakes.

Moreover, as discussed in the '697 application, the average serving of potato (one medium potato or about 148 grams) contains only 3 grams of protein. There is a need for a mashed potato product having significantly increased protein content, without negatively affecting the consumer acceptance thereof, and to make the health claim of providing a minimum of 6.25 grams of soy protein per serving. Additionally, potato products, such as mashed potatoes containing 100% potatoes, are known in the art to exhibit a bland starchy taste and pasty feel. This is due in part to the fact that potatoes contain large amounts of starch, and little or no fat or oil. Moreover, potato is in the nightshade family and suspect in certain arthritic maladies. Soybean flakes-potato flakes compositions made possible by the present invention contain significantly reduced amounts of potato and higher amounts of soybean flakes than previously thought possible.

The present inventors have discovered that toasting full fat, enzyme active soybean flakes made from mechanically dehulled soybeans permits unexpectedly high amounts of up to about 60% toasted soybean flakes to be incorporated into soybean flakes-potato flakes compositions, with excellent flavor and texture retention. The toasted soybean flakes-potato flakes products made from the present inventive compositions avoid the expected problems of undesirable beany flavors, and other objectionable changes in taste and texture. Use of toasted soybean flakes unexpectedly results in a soy protein enriched and soy oil containing mashed potato products, which are not beany flavored and have excellent nutritional, taste and texture properties.

Prior Art Relating to Soy-potato Mixtures:

Addition of small amounts of soya flour to mashed potatoes was mentioned as early as 1941 (*The Soybean Digest*, Vol. 2, No. 9, December 1941, pages 2 to 5).

U.S. Pat. No. 4,005,139 illustrates dehydrated potato solids in the form of flakes, granules and/or powder, and containing various additives, binders, fillers, gums, and texturizing agents, in which the potato portion constitutes at least 50% of the mixture. The dehydrated potato solids are disclosed to be formed into slurry or dough, and used subsequently for preparing products suitable for deep frying.

U.S. Pat. No. 6,066,353 illustrates dehydrated potato flakes prepared from potato slices, slivers and/or nubbins, which flakes are used to prepare more cohesive, non-sticking, machinable dough compositions.

U.S. Pat. No. 6,235,333 illustrates a sheetable dough composition useful for making fried snack pieces. The sheetable dough composition is disclosed to comprise about 50% to about 70% of a starch-based material, wherein said starch-based material comprises from about 25% to about 100% dehydrated potato flakes. U.S. Pat. No. 6,235,333 further indicates that the starch-based material may contain other ingredients including potato flour, tapioca flour, peanut flour, wheat flower, oat flour, rice flour, corn flour, soy meal, corn meal, potato starch, tapioca starch, corn starch, oat starch, cassava starch and mixtures thereof.

U.S. Pat. No. 6,287,622 similarly discloses 30-60% "other starch" such as soy meal. U.S. Pat. No. 3,911,142 illustrates a ready-to-eat snack type wafer made by dry mixing potato flakes and various ingredients including soy protein, blending with water, followed by sheeting or extruding, and then baking or frying.

U.S. Pat. No. 3,950,550 shows making a fried tofu product by forming a kneaded soy dough, which may contain potato starch, into a desired shape, and deep frying the shaped material in two successive stages.

U.S. Pat. No. 6,479,089 illustrates a cohesive soy based machinable dough comprising soy grits and potato starch as one of the additional ingredients.

U.S. Pat. No. 6,177,116 discloses a dough composition useful for preparing fried chips, which composition is a starched-based material comprising from about 40% to about 90% combined potato flakes and granules, and from about 10% to about 60% of other starch containing ingredients selected from potato flour, tapioca flour, peanut flour, wheat flour, oat flour, rice flour, corn flour, soy meal, corn meal, potato starch, tapioca starch, cornstarch, oat starch, cassava starch, and mixtures thereof.

U.S. Pat. No. 6,291,009 teaches making chips or crackers using soy flour and potato flour. U.S. Pat. No. 5,866,192 discloses preparation of an edible material containing soybean walls purported to have a good taste and mouthfeel, and useful similarly to soybean jam or mashed potato.

Japanese Patent document #53-133657, dated Nov. 28, 1978, illustrates a method comprising kneading with water a dry potato powder mixture, containing added gluten powder, optionally together with 1% or more soybean protein powder, dry egg white powder, polysaccharide and starch; followed by molding the obtained dough into suitable form, and frying it in suitable oil.

Japanese Patent document 44-11594 (1969) illustrates a method of producing soybean paste powder that can be suitably crushed and treated, characterized by adding 3% to 25% steamed potato or dried mashed potato flake to uncooked soybean paste and drying using a single drum dryer.

Japanese Patent Publication #07-227239, published Aug. 29, 1995, shows imitation potato made by gelling a mixture of potato flakes and vegetable fibers (e.g., the vegetable fibers of soybean flour), to which a gelling agent has been added.

Prior Art Relating To Heat Treating Soy Materials:

Roasting of soy materials to reduce beany or off-flavors has been generally known in the prior art, as illustrated by U.S. Pat. Nos. 5,936,069 and 3,971,856 (see second paragraph of Description). However, the prior art roasting procedures have generally been carried out, not on full fat, enzyme active soybean flakes made from dehulled soybeans, but on defatted or chemically treated or otherwise prepared soy materials. Furthermore, the roasting processes of the prior art have generally been carried out by heating methods other than used in making the toasted soybean flakes of the present invention, and at temperatures and conditions causing significant denaturing of the soy proteins. Moreover, the toasted soybean flakes used in the present invention differ variously from the prior art in that the starting soybean flakes are not defatted or chemically treated, or steam heated, or made from soybean meal or flour. The reduction of the soybean material in the prior art to meal or flour significantly increases its exposure to oxidation and results in generation of off-flavors and denaturizaton of the soy proteins.

In the present invention, the toasted soybean flakes are prepared from the full fat, enzyme active soybean flakes made from dehulled soybeans. The soybean flakes used to prepare the toasted soybean flakes of the present invention are preferably made by the method shown in U.S. Pat. No. 4,895,730, which patent is incorporated herein by reference. The toasted flakes are prepared by subjecting the full fat, enzyme active soybean flakes quickly to blown fluidizing dry air heat while moving on and/or above a vibrating surface.

U.S. Pat. No. 6,391,374 is teaches pretoasting defatted soy flakes to reduce the bittery or beany off-flavors of the soybean due to lipid peroxidation catalyzed by lipoxygenase.

U.S. Pat. No. 3,971,856 illustrates subjecting dehulled, cracked soybeans to water at 180° F. to a maximum of 212° F. to eliminate any toasting of the soybeans.

U.S. Pat. No. 4,810,513 shows making full fat soybeans flakes from raw soybeans with hulls intact, including the step of drying the flakes in a forced air drier by alternating application of superheated air.

U.S. Pat. No. 4,041,187 illustrates heating tenderized soybean cotyledons sufficiently, such as in an air drier at 200° F. for five minutes, to deactivate the lipoxygenase enzymes.

U.S. Pat. No. 3,941,890 illustrates making soy milk including cooking soybeans in a microwave oven for a time sufficient to destroy the trypsin inhibitor and eliminate any unpleasant beany taste, but for a time insufficient to roast the material.

U.S. Pat. No. 4,103,034 illustrates preparing dried flaked textured vegetable protein from defatted or full-fat soybean flour, which has been dried at temperatures which assure partial or substantial deembitterment without scorching. The '034 Patent discusses toasting carried out preferably between 180 and 200° F. for preferably between 1.5 and 2.5 hours, using hot dry air (page 12).

U.S. Pat. No. 5,710,365 teaches heat treating de-oiled (defatted) soybean flakes to denature the protein therein.

U.S. Pat. No. 4,748,038 illustrates subjecting whole or dehulled and split soybeans to live steam or water for a time sufficient to avoid green, painty or raw flavors developing and short enough such that beany or bitter flavors do not develop.

U.S. Pat. No. 4,409,256 shows making soymilk involving comminuting whole soybeans having the hulls on, forming a slurry and simultaneously heating by an infusion of live steam initiating inactivation of trypsin inhibitor and lipoxygenase without fixing or substantially denaturing the soybean protein.

U.S. Pat. No. 4,639,216 shows flame roasting cereal grains including soybeans to destroy toxic enzymes in the raw soybeans which interfere with digestion and growth in animals, and to sterilize the grain.

U.S. Pat. No. 4,923,710 shows roasting deskinned and split soybean halves which have been soaked for swelling and then dewatered.

SUMMARY OF THE INVENTION

It is an object of the present invention to provide toasted soybean flakes-potato flakes compositions containing unexpectedly increased amounts of toasted soybean flakes, without incurring objectionable beany flavors. The compositions of the present invention are useful for preparing highly soy protein enriched and soy oil containing mashed potato products. The toasted soybean flakes are prepared from full fat, enzyme active soybean flakes made from dehulled soybeans.

The novel mashed potato products made from the inventive toasted soybean flakes-potato flakes compositions have highly increased protein content and other nutritional benefits, as compared with the soybean flakes-potato flakes compositions set forth in parent application Ser. No. 10-382, 697. The present inventive mashed potato products made from toasted soybean flakes-potato flakes compositions and containing up to about 60% toasted soybean flakes, unexpectedly exhibit excellent flavor and texture characteristics, describable as a creamy but thick consistency.

The present invention furthermore permits the use of soybean varieties, other than expensive null and especially triple null soybeans, while avoiding beany flavors even at the higher toasted soybean flake levels. Black hilum soybeans are also usable in preparation of the soybean flakes used to make the inventive toasted soybean flake. Previously color from black hilum variety soybeans was carried over in the soybean flakes and products made therefrom, and found objectionable by some. The toasted soybean flakes when medium and heavy toasted further provide a pleasant nutty or toasted flavor to the inventive mashed potato products. At medium roasting the toasted soybean flakes provide a sweet flavor.

It is an object of the present invention to provide a method for preparing the highly soy protein enriched and soy oil containing mashed potato products from the inventive compositions. An additional object of the invention is the highly enriched soy protein enriched and soy oil containing mashed potato products, which products exhibit excellent flavor and texture characteristics.

The present inventors faced the problem of how to incorporate amounts of soybean flakes in excess of 45% in potato flake compositions, without the predicted objectionable beany flavors and without loss of other flavor and textural qualities. The present inventors have discovered that surprisingly mashed potato products, made from compositions containing up to 60% of the inventive toasted soybean flakes, avoid the problems of beany flavors, retain excellent taste and textural qualities, and are have highly enriched in soy protein content. The present inventors have discovered that compositions containing potato flakes and the inventive toasted soybean flakes in amounts up to about 60% toasted soybean flakes, preferably between about 45% and 60%, are useful in making novel and unobvious highly protein enriched, soy oil containing mashed potato products having enhanced nutritional properties, and excellent taste and texture. These mashed potato products surprisingly exhibit excellent flavor and texture characteristics, describable as a creamy but thick consistency. The inventors have also discovered method for preparing the highly soy protein enriched and soy oil containing mashed potato products from the potato flake and toasted soy flake containing compositions. Additionally, the inventors have discovered said soy protein enriched and soy oil containing mashed potato products per se. Toasted soybean flakes contain less starch than potato, and beneficially provide substantial amounts of protein and flavor contributing oil to the inventive composition and product. An outstanding feature of the inventive toasted soybean containing mashed potato product is the relatively high content of balanced proteins, containing in readily available form all of the so-called essential amino acids in proportions that insure or promote efficient utilization within the body.

Unlike the cited prior art, which tend to use hulled (hull not removed), de-fatted soy materials, concentrates or isolates, the toasted soybean flakes of the present invention are prepared from full fat, enzyme active soybean flakes made from mechanically dehulled soybeans. The toasted soybean flakes and method of making same are set forth in detail in the copending "TOASTED SOYBEAN FLAKES . . . " application. The toasted soybean flakes used in the present invention provide significant advantages over soybean materials and/or flakes that have not been dehulled, or have been defatted or otherwise chemically treated, or processed by grinding or pressure extruding. Processing by grinding or extruding to form granules and particularly powders dramatically increases the surface area of the soybean material adversely exposed to oxygen and moisture, and further subjects the soybean material to denaturing heat during processing. The exposure and additional heating lead to degradation of the soybean material, especially denaturing of the proteins, and production of off-flavors.

DETAILED DESCRIPTION OF THE INVENTION

Soybean Flakes:

The soybean flakes useful for making the toasted flakes of the present invention are full fat, enzyme active flakes made from dehulled soybeans. "Full fat" refers to soybean flakes where no fat has been removed, except that very small amount lost during washing and dehulling. While the soybean flakes may be made by a variety of processes known in the prior art, it is advantageous that the soybeans be mechanically dehulled and processed. The temperature of the soybean material during processing to flakes should be maintained no higher than 55° C., and more preferably no higher than 50° C. Higher temperatures lead to denaturing of the soybean material, and off flavors. Soybean flakes made in accordance with the method set forth in U.S. Pat. No. 4,895,730 are especially useful for making the toasted flakes used in the present invention. These flakes are made from full fat, enzyme active, mechanically dehulled soybeans.

These untoasted soybean flakes are present, in the soybean flakes-potato flakes compositions set forth in parent patent application Ser. No. 10-382,697, in amounts from 1 to 45% by weight. Where the soybean flakes are made from null variety soybeans, amounts from 20 to 45%, and especially 25 to 45% by weight, are disclosed as beneficial. A most preferred composition disclosed in the '697 application contains 25 to 45% full fat, enzyme active soybean flakes prepared from mechanically dehulled and processed full fat, enzyme active triple-null-variety soy beans. The preferred soybean flakes are disclosed as those made substantially by the method set forth in U.S. Pat. No. 4,895,730. MicroSoy Flakes® are full fat, enzyme active, and made from mechanically dehulled and processed soybeans. Soybeans for preparing the soybean flakes used in the '697 application are clear or yellow hilum soybeans. Null variety soybeans, and especially triple null soybeans, are disclosed in the '697 application as highly preferred, especially for the higher ranges of soybean flake contents.

In the method disclosed in the '730 patent, the soybean flakes are prepared by (1) brushing the soybeans to remove earth matter and earth born germs; (2) adjusting the water content to facilitate separation of the skin portion; (3) separating the skin portion from the flesh portion, while simultaneously dividing the flesh portion of each soybean into four to eight parts; and, (4) passing the soybean granules thus obtained through flat-pressing rollers, whereby a product in the form of a mass of uniformly distributed, dehulled, full fat, enzyme active soybean flakes is obtained. The adjustment of water content of the soybean facilitates skin/flesh separation and also dries the flesh, so that a product having a low moisture content and good storage stability can be obtained when the flesh is reduced to flakes. Said water content adjustment is carried out such that the temperature of the soybean material does not exceed temperatures which will not cause thermal denaturing of the soy protein. The temperature of the soybean material does not exceed 55° C.; and more preferably 50° C. The heat resistant earth-born germs and sporal germs are completely removed during the brushing and dehulling or skinning of the soybeans. These germs are not removed by the conventional step of washing. The resulting soybean flakes and compositions and foodstuffs prepared therefrom are thus rendered less perishable and highly wholesome. Removal of germs and adjustment of the water content result in soybean flakes having greatly enhance storage stability.

As set forth in parent U.S. patent application Ser. No. 10-382,697, use of soybean flakes provides a unexpected difference in the flavor and texture perception of the mashed potato product made therefrom, as compared with the use of soy granules or powder. During preparation of soybean granules and especially powder, the surface area of the soybean material is increased, with consequent increased degradative exposure to oxygen, moisture, and additional heating during grinding. The present inventors have discovered the unexpected benefit that toasted soybean flakes and potato flakes mix and remain mixed exceptionally well, and do not tend to separate in handling and storage, as opposed to soybean granules or powder. This is due at least in part to the discovery that the soybean flakes and the potato flakes are relatively close in texture, size and specific gravities. This is especially true where the toasted soybean flakes are prepared from soybean flakes made by the method set forth in U.S. Pat. No. 4,895,370. Moreover, the dehulled, full fat, enzyme active flakes favored for use in making the toasted soybean flakes used in the present invention qualify as natural, and are free from "harmful" additives. When soybeans and potatoes qualifying as organic are used, the inventive composition and inventive product would also qualify as organic.

Soybean flakes having a thickness of about 0.2 mm. are particularly useful in making the toasted soybean flakes used in the present invention.

The present invention permits numerous varieties of soybeans to be used for making the soybean flakes from which the toasted soybean flakes are made, without incurring beany flavors even at high concentration levels of up to 60% in the inventive toasted soybean flakes-potato flakes compositions. Hilum varieties including clear, yellow and black can be used. The expensive null including triple null varieties are not required, even at toasted soybean flake levels of up to 60%. "Null" refers to soybeans wherein the lipoxygenase enzymes have been bred out of the soybeans.

Method of Preparing Toasted Soybean Flakes:

The present inventors discovered a method of preparing the toasted soybean flakes used in the present invention. This method is set forth in detail in the copending "TOASTED SOYBEAN FLAKES . . . " application, which has incorporated herein by reference. The present inventors discovered that toasting full fat, enzyme active soybean flakes unexpectedly substantially reduces or eliminates the undesirable beany or off-flavors commonly associated with soybean flakes, and without significant protein denaturing. The present inventors have discovered that unexpectedly higher amounts of the toasted soybean flakes, up to about 60%, can be incorporated into soybean flakes-potato flakes compositions, without beany flavors, and while retaining excellent taste and texture, in the mashed potato products made from these compositions. The present inventors also discovered that the toasted soybean flakes, when medium and heavy toasted, can provide a desirable nutty or roasted flavor; and, when medium toasted provide a pleasant sweet taste. The present inventors also discovered that the toasted soybean flakes are also unexpectedly useful in hot and cold cereal compositions, including those made with rolled oats; granola and power bar type compositions; shake-and-bake type compositions; hot beverage mix compositions similar to malted milk mixes; and, meat analogue "veggie burger" type compositions.

The toasted soybean flakes are prepared by subjecting full fat, enzyme active soybean flakes made from dehulled soybeans to relatively high heat from dry heated fluidizing air for a relatively short time while moving on and/or above a moving and/or vibrating surface. This toasting method substantially reduces and eliminates undesirable beany or off-flavors commonly associated with soybean flakes, without significant protein denaturing. This significantly increases their usefulness and the percentage soybean flakes which can be used in applications such as toasted soybean flakes-potato flakes compositions. The toasting at higher levels results in a desirable nutty and/or roasted flavor.

The preferred toasting method comprises the steps of:

(1) metering full fat, enzyme active soybean flakes made from dehulled soybeans into one end of a fluid bed toaster-drier, at a flow rate dependent on the thickness of the starting soybean flakes and the desired level of toasting;

(2) contacting the soybean flakes in the toaster-drier with heated dry fluidizing gas at a temperature and for a time sufficient to toast the flakes, whereby the beany and/or off-flavors are substantially reduced or eliminated, without significant denaturing of the proteins in the flakes;

(3) passing the toasted flakes from the toaster-drier to a cooler, where the toasted flakes are cooled to desired ambient temperature; and, (4) transferring the cooled flakes to packaging or other storage or directly to end use.

The preferred toasting method is further described in the "Description Of the Drawing" below.

The toasted soybean flakes need not be cooled to ambient temperature when it is advantageous to use them at temperatures above ambient. The toaster-drier and the cooler are preferably of the vibratory fluid bed type. The temperature of the toaster-drier is maintained between 350 and 420° F., depending on the thickness of the soybean flake and the desired level of toasting. For example, temperatures between 350 and 360° F. are used for light toasting flakes having a thickness of about 0.02 mm. Temperatures for medium and heavy toasting flakes, having a thickness of about 0.02 mm., are preferably between 366 to 380° F. and 370 to 390° F., respectively. In a preferred embodiment of the inventive toasting method, full fat, enzyme active soybean flakes made from dehulled soybeans are metered into a vibratory fluid bed toaster-drier at a flow rate, temperature, and residence time set according to the desired degree of toasting.

Table 1 below sets forth examples of typical toaster and cooler operating conditions for different soybean flake thicknesses (i.e., 0.02 mm., 0.06 mm. and 1.2 mm.), and toasting levels (i.e., low "L", medium "M" and high "H"). In Table 1, the designation TSX02-L, for example, refers to toasted "T" conventional MicroSoy® flakes "SX" having a thickness of 0.02 mm. "02", and subjected to a light toast "L".

TSX06-M refers to toasted MicroSoy® flakes "SX" having a thickness of 0.06 mm., which are medium toasted.

TABLE 1

| Product | Input Flow Rate (lbs./min.) | Product Depth (inches) | Toaster Temp. (° F.) | Toaster Freq./RPM (Hz./RPM) | Cooler Freq. (Hz.) |
|---|---|---|---|---|---|
| TSX02-L | 4.5-5.0 | 1-3.0 | 350-360 | 750-976 | 40-47 |
| TSX02-M | 4.5-5.0 | 2.5-3.0 | 366-380 | 800-976 | 45-47 |
| TSX02-H | 4.5-5.0 | 2.5-3.0 | 370-390 | 800-1008 | 40-47 |
| TSX06-L | 5.2 | 2.0 | 360 | 1115 | 58 |
| TSX06-M | 5.2 | 2.0 | 370 | 1115 | 39 |
| TSX06-H | 6.5 | 2.5-3.0 | 380-420 | 1000-1050 | 45-55 |
| TSX12-L | — | — | — | — | — |
| TSX12-M | 6.5 | 2.5-3.0 | 380 | 1000-1100 | 40-45 |
| TSX12-H | 5 | 3 | 420 | 800-1000 | 42 |

Note
TSX12-L was not run due to the 1.2 mm. thickness of the flakes.

As set forth the copending "TOASTED SOYBEAN FLAKES . . . " application, the present inventors discovered that toasting temperatures in the range of about 350 to 390° F. and toasting times of about 3 to 5 minutes are particularly useful. A temperature of about 360° F. has been found useful, especially for lighter toasting. Within these temperatures and times, the flakes are quickly heated to a high heat using dry hot fluidizing gas, thereby removing or eliminating a high percentage of the beany or off-flavors, while minimizing and avoiding denaturing of the proteins in the soybean flakes. Thus, a high percentage of the proteins remain soluble and nutritionally available.

Figure 1:
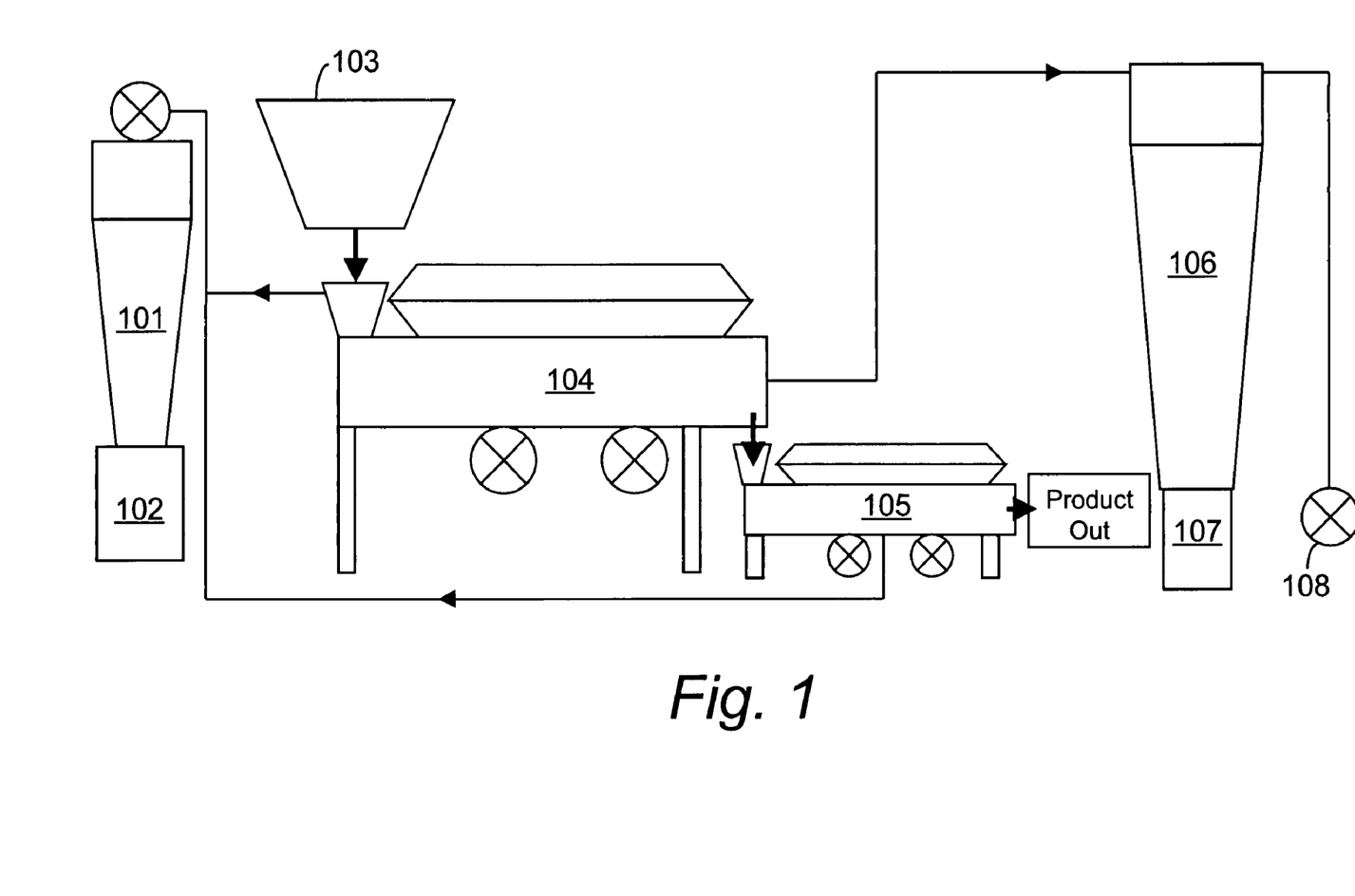
FIG. 1 is a block flow diagram showing one embodiment of the inventive soybean flake toasting method and apparatus.

Description of the Drawing:

The drawing is a block flow diagram showing one embodiment of the inventive soybean flake toasting method and apparatus. Reference number 103 denotes a feeding tank and hopper for introducing full fat, enzyme active soybean flakes into vibratory toaster/dryer 104. The toasted soybean flakes pass out of toaster/dryer 104 into vibratory fluid bed cooler 105. The toasted cooled soybean flakes pass out of cooler 105 to a container labeled "Product". Gases and fines removed from the vibratory fluid bed cooler 105, as well as fines removed from the inlet end of toaster/dryer 104, are conveyed to cyclone 101 which includes dust collector portion 102. An additional cyclone 106, with associated dust collector portion 107, is also connected to vibratory fluid bed toaster/dryer 104. Gas outlet pump 108 is attached to the upper end of cyclone 106.

One embodiment of the present invention is described with reference to FIG. 2 and TABLE 1. Full fat, enzyme active soybean flakes made from dehulled soybeans are metered by feeder/hopper 101 into one end of vibratory fluid toaster/dryer 104 at a flow rate depending on the thickness of the soybean flakes and the desired level of toasting. For example, conventional MicroSoy Flakes® having a thickness of 0.2 mm. (denoted TSX02-M in TABLE 1) were Medium toasted at an input flow rate of 4.5-5.0 lbs./min., a product depth of 2.5-3 inches in the toaster, a toaster temperature of 366-380° F., a toaster vibration frequency or RPM of 800-976, and a cooler frequency of 45-47 (Hertz). The toasted flakes were bagged in 20 kg. bags and stored in a dry cool area. The toasting time was maintained such that substantial reduction or elimination of the beany or off-flavors occurred, but without an significant denaturing of the soy protein. This time is generally between 3 and 5 minutes.

Potato Flakes:

Potato flakes useful in the present invention are generally commercially available. Such potato flakes are typified, for example, by those available from RDO Foods Company in Grand Forks, N.Dak. The RDO Foods Company dehydrated mashed potato flakes contains 0.3% to 0.6% mono- & diglycerides, 0 to 1000 ppm added sodium acid phosphate, 50 to 100 ppm added citric acid, and 3% reducing sugars.

Toasted Soybean Flakes-Potato Flakes Composition:

As disclosed in parent '697 patent application, the inventors named therein discovered a composition comprising potato flakes and from 1-45% full fat, enzyme active soybean flakes, preferably from 20-45%, and most preferably from 25 to 45%. The present inventors have discovered compositions comprising potato flakes and up to 60% toasted soybean flakes, preferably from 45 to 60% toasted soybean flakes. The novel and unobvious highly soybean protein enriched and soy oil containing mashed potato products also constitute a part of the present invention.

Methods of Preparing Mashed Potato Products:

The present inventors have discovered methods for making soybean protein enriched and soy oil containing mashed potato products from the novel toasted soybean flakes-potato flakes compositions. The present invention includes such methods. The soybean protein enriched and soy oil containing mashed potato products are made, in a first embodiment, by adding the inventive composition to water at or near boiling, while continuously stirring. As soon as no dry flakes remain visible, adding dairy or soy milk (or other milk substitute) to the mix, while continuing to stir, until all the liquids are absorbed. Other ingredients may, of course, be added as desired to provide additional flavor or texture, such as salt, other seasonings, butter, butter substitutes, etc.

A first preferred method of preparing the inventive soy protein enriched and soy oil containing mashed potato product, having excellent taste and texture, describable as a creamy but thick consistency, is as follows:

A. Heating water to at or near boiling;
  B. Optionally adding salt to the water;
  C. Stopping heating the water, and immediately adding the inventive toasted soy flake-potato flake composition to the heated water, while continuously stirring;
  D. As soon as no dry flakes remain visible, adding dairy milk or soymilk, while continuing to stir until all liquids are absorbed into the mixture; and,
  E. Optionally adding butter or butter substitute with the milk or after all liquids are absorbed.

As an illustrative example, the following amounts were used in preparing the soybean containing mashed potato:

Mixture (MicroSoy Flakes+Potato Flakes)=117 grams
  Salt=2.9 grams (optional)
  Water=9 ounces to 17 ounces
  2% Milk=7 ounces
  Butter=optional A alternate preferred method uses microwave heating in preparing the inventive soy protein enriched and soy oil containing mashed potato product and includes the following steps:

A. Mixing water, soymilk and/or dairy milk and salt in a microwave-safe container;
  B. Loosely covering the container so steam can escape and microwaveing for 2 minutes on high or until the mixture just starts to boil;
  C. Immediately adding the heated water/milk solution to a bowl containing the inventive composition of toasted soybean flakes and potato flakes;

D. Mixing and whipping vigorously; and,

E. Optionally adding more water, soymilk and/or dairy milk for a creamier texture.

As an illustrative example, the following amounts were used in the alternate method:

MicroSoy Flakes+Potato Flakes=58.5 grams
Salt=1.0 grams (optional)
Water=100 grams
Soymilk or Dairy Milk=41 grams
Butter=1 tablespoon (optional)

Mashed Potato Products:

A further aspect of the present invention includes the highly soy protein enriched and soy oil containing mashed potato products prepared from the potato flake and toasted soy flake compositions of this invention. A most preferred inventive soy protein enriched and soy oil containing mashed potato product is that made using toasted MicroSoy Flakes®, which flakes are made using from full fat, enzyme active soybean flakes which have been mechanically dehulled.

Optional Ingredients:

Additional optional ingredients may be added to the inventive composition, during the inventive method, and/or to the inventive product, such as dairy or soy milk (whole, powdered, or concentrated), butter, butter substitutes, and/or various spices. The presence of the soy protein and soy oil in the inventive mashed potato product unexpectedly provides, in addition to the health benefits thereof, an enhancement of perceived taste and texture, describable as thick and creamy. The inventive mashed potato product contains an enhanced amount of beneficial protein and oil from the soy flakes, and a lesser amount of potato starch per serving.

COMPARATIVE TESTS AND EXAMPLES IN PARENT PATENT APPLICATION Ser. No. 10-382,697

An evaluation, using a panel of 36 members, was conducted to determine the concentrations of soybean flakes (MicroSoy® Flakes) at which the flavor and texture of the cooked mashed potato product became unacceptable; and to determine if the use of specialty MicroSoy® Flakes made from lipoxygenase null soybeans, would allow higher concentrations of soybean flakes in the inventive composition. The panelists were asked to evaluate six characteristics of the mashed potato products, i.e., grittiness, potato flavor, grassy flavor, bitter flavor, saltiness, and astringency or mouth-dryness. Five samples were presented containing the following concentrations of MicroSoy® flakes per sample: Control (0%), Regular 1 (20%), Regular 2 (25%), Null 1 (20%), and Null 2 (25%). The "Regular" samples were prepared from flakes made using IA301 1 variety soybeans, and the "Null" samples were prepared using flakes made using IA2025 variety soybeans. The Control contained no soybean flakes. It was concluded from these tests that soybean variety made a difference in flavor perception of the soybean flake fortified mashed potato product. MicroSoy® flake addition in lower concentrations was surprisingly and unexpectedly found to enhance the potato flavor in the soybean flake fortified mashed potato product.

MicroSoy® flakes having no additives, and dehydrated mashed potato flakes, obtained from RDO Foods Company in Grand Forks, N.Dak., were used in making the samples tested in the evaluation. The mashed potato flakes analyzed as follows:

a. BHA=0%
b. Mono & Diglycerides=0.3 to 0.6%
c. Sodium Acid Phosphate=0 to 1000 ppm (added)
d. Citric Acid=50 to 100 ppm (added)
e. Reducing Sugars=3%

The ratio of ingredients used in the test examples were as follows:

Inventive Composition (MicroSoy Flakes+Potato flakes)= 117 g.
Salt=2.0 g. (optional)
Water=9 to 17 oz. (266.157 to 443.595 ml.)
2% Milk=7 oz. (207.011 ml.)

The test samples were prepared according to the preferred method of the invention set forth earlier herein. The five test samples are compared in each of the six comparative test examples.

The tests set forth in the examples used the statistical analysis system seven (SAS) and a general linear regression procedure (GLM). The test controls the Type I comparison-wise error rate, not the experimental error rate; i.e. compares the error rate on the experimental data, not on the experimental method per se.

The number "trt" is a arbitrary number assigned to the samples tested to avoid and minimize any bias in the panel to consecutive sample numbers. Such bias might occur if samples were numbered consecutively as 1, 2, 3, 4, 5, 6, 7, etc. The panelists rated the samples on a scale of 1 to 150. The higher the number the stronger the tested characteristic or attribute. The evaluation numbers are expressed as a "mean" thereof. N indicates the number of panelists testing a given sample. Samples having the same "t Grouping" letter (i.e., A, B and/C) do not significantly differ from each other in the looked for characteristic or attribute. For example, in Test Example I for "gritty", the samples for Regular 20%, Null 20% and Null 25% had a "t grouping" of B, indicating they did not significantly differ from each other in the "gritty" attribute. Likewise, Control 0% and Null 20% each had a "t Grouping" of C, indicating they did not significantly differ from each other in the "gritty" attribute. Also, Regular 20%, Regular 25% and Null 25% each received "t Grouping" designations, and thus did not significantly differ from each other in the "gritty" attribute. Alpha represents the level of tolerance for determining which sample test scores or numbers to drop or include in the test results. I.e., how narrow the bell curve within which test scores or numbers must fall to be included in the test results; or, conversely which test scores or numbers fall outside the bell curve and are rejected and not included in the test results.

Comparative Example 1 for "Gritty"

| | |
|---|---|
| Alpha | 0.05 |
| Error Degrees of Freedom | 174 |
| Error Mean Square | 1472.237 |
| Critical Value of t | 1.97369 |
| Least Significant Difference | 17.901 |
| Harmonic Mean of Cell Sizes | 35.79545* |

*Cell sizes were not equal

| Sample | Percent | t Grouping | Mean | N | trt# |
|---|---|---|---|---|---|
| Control | 0% | C | 45.314 | 35 | 389 |
| Regular | 20% | B A | 72.611 | 36 | 108 |
| Regular | 25% | A | 79.611 | 36 | 721 |

-continued

| Sample | Percent | t | Grouping | Mean | N | trt# |
|---|---|---|---|---|---|---|
| Null | 20% | B | C | 59.944 | 36 | 574 |
| Null | 25% | B | A | 69.750 | 36 | 676 |

Comparative Example 2 for "Potato" Flavor

| | |
|---|---|
| Alpha | 0.05 |
| Error Degrees of Freedom | 174 |
| Error Mean Square | 1357.553 |
| Critical Value of t | 1.97369 |
| Least Significant Difference | 17.189 |
| Harmonic Mean of Cell Sizes | 35.79545 |

| Sample | Percent | t | Grouping | Mean | N | trt# |
|---|---|---|---|---|---|---|
| Control | 0% | | A | 92.543 | 35 | 389 |
| Regular | 20% | | C | 47.222 | 36 | 108 |
| Regular | 25% | B | C | 63.750 | 36 | 721 |
| Null | 20% | B | A | 77.694 | 36 | 574 |
| Null | 25% | B | | 71.500 | 36 | 676 |

Comparative Example 3 for "Grassy" Flavor

| | |
|---|---|
| Alpha | 0.05 |
| Error Degrees of Freedom | 174 |
| Error Mean Square | 1296.31 |
| Critical Value of t | 1.97369 |
| Least Significant Difference | 16.797 |
| Harmonic Mean of Cell Sizes | 35.79545 |

| Sample | Percent | t | Grouping | Mean | N | trt# |
|---|---|---|---|---|---|---|
| Control | 0% | C | | 34.400 | 35 | 389 |
| Regular | 20% | | A | 93.444 | 36 | 108 |
| Regular | 25% | | B | 63.083 | 36 | 721 |
| Null | 20% | C | B | 50.861 | 36 | 574 |
| Null | 25% | | B | 56.694 | 36 | 676 |

Comparative Example 4 for "Bitter" Flavor

| | |
|---|---|
| Alpha | 0.05 |
| Error Degrees of Freedom | 174 |
| Error Mean Square | 1182.524 |
| Critical Value of t | 1.97369 |
| Least Significant Difference | 16.043 |
| Harmonic Mean of Cell Sizes | 35.79545 |

| Sample | Percent | t | Grouping | Mean | N | trt# |
|---|---|---|---|---|---|---|
| Control | 0% | | B | 27.771 | 35 | 389 |
| Regular | 20% | | A | 62.167 | 36 | 108 |
| Regular | 25% | | B | 39.083 | 36 | 721 |
| Null | 20% | | B | 34.194 | 36 | 574 |
| Null | 25% | | B | 41.806 | 36 | 676 |

Comparative Example 5 for "Astingent"

| | |
|---|---|
| Alpha | 0.05 |
| Error Degrees of Freedom | 174 |
| Error Mean Square | 1899.571 |
| Critical Value of t | 1.97369 |
| Least Significant Difference | 20.333 |
| Harmonic Mean of Cell Sizes | 35.79545 |

| Sample | Percent | t | Grouping | Mean | N | trt# |
|---|---|---|---|---|---|---|
| Control | 0% | | A | 63.63 | 35 | 389 |
| Regular | 20% | B | | 42.00 | 36 | 108 |
| Regular | 25% | B | A | 60.17 | 36 | 721 |
| Null | 20% | B | A | 46.53 | 36 | 574 |
| Null | 25% | B | A | 51.67 | 36 | 676 |

Comparative Example 6 for "Salty" Flavor

| | |
|---|---|
| Alpha | 0.05 |
| Error Degrees of Freedom | 172 |
| Error Mean Square | 1142.347 |
| Critical Value of t | 1.97385 |
| Least Significant Difference | 15.859 |
| Harmonic Mean of Cell Sizes | 35.39326 |

| Sample | Percent | t | Grouping | Mean | N | trt# |
|---|---|---|---|---|---|---|
| Control | 0% | | A | 38.057 | 35 | 389 |
| Regular | 20% | | A | 47.800 | 35 | 108 |
| Regular | 25% | | A | 49.143 | 36 | 721 |
| Null | 20% | | A | 51.167 | 36 | 574 |
| Null | 25% | | A | 51.972 | 36 | 676 |

Further comparative testing was done using a consumer panel with 44 members, to determine the acceptability the inventive soybean containing mashed potato product, especially at higher soybean concentrations. The panelists were asked to individually evaluate five samples containing the following MicroSoy® Flake (MSF) concentrations: No MSF (0%) (#676), 20% Null MSF (#389), 30% Null MSF (#676), 40% Null MSF (#721), and 40% Roasted MSF (#108) Roasted contained flakes contained IA3006 variety MSF, and the Nulls contained IA2025 variety MSF. The higher the number the greater the consumer acceptance level found by the panel. The tabulation of the results of this further comparative testing were as follows:

| Percent MSF | Sample # | Overall Rating | Flavor | Texture | Appearance |
|---|---|---|---|---|---|
| No MSF | 574 | 981 | 983 | 983 | 981 |
| 20% Null MSF | 389 | 979 | 979 | 979 | 979 |
| 30% Null MSF | 676 | 975 | 983 | 984 | 983 |
| 40% Null MSF | 721 | 985 | 982 | 984 | 943 |
| 40% Roasted MSF | 108 | 984 | 984 | 984 | 981 |

Very surprisingly and unexpectedly the consumer acceptance test indicates little or no significant difference in flavor, texture or appearance perception. Although the appearance of Sample #721 (40% Null MSF) was significantly different than all other samples tested.

Given the art recognized problems of undesirable flavors and textures resulting from incorporation of soybean materials, especially in amounts as high as tested, applicants have discovered that unexpectedly full fat, enzyme active, dehulled soybean flakes can be substituted in mashed potato flake compositions without detrimentally altering the mashed potato product made therefrom, and surprisingly even enhancing the flavor and texture. It would have been totally unexpected, given the art recognized problems and difficulties with inclusion of soybean materials in various food stuffs, that incorporation of full fat, enzyme active soybean flakes in lower amounts would enhance the texture and flavor of mashed potato products. And, that incorporation in amounts of 20 or 25% and higher soybeans flakes, especially made with Null soybeans, would not adversely affect the texture or flavor of the resulting soybean containing mashed potato product. The panel members who ate potato less than once a month (7 in number) preferred all samples with MSF added over the 0% MSF sample. Panelists who ate potatoes 2-4 times a month (23) found no difference in the samples. However, of these panelists fourteen preferred the texture of the mashed potato with higher concentrations of MSF (30 and 40% MSF) over the no MSF and 20% MSF. Overall the sample with 40% MSF was rated most acceptable.

COMPARATIVE TEST OF ADVANTAGES OF TOASTED MICROSOY FLAKES OVER UNTOASTED MICROSY FLAKES

A taste test was done to determine the advantages of toasted MicroSoy flakes (TSX02-M) over untoasted MicroSoy flakes, when used to replace 40% of the potato flake in a mashed potato mix. The untoasted MicroSoy flakes were made from triple null variety soybeans; while the toasted MicroSoy flakes were made from a blend of soybean varieties not including null or triple null. The test clearly demonstrates that a 40% addition of the TSX02-M toasted soybean flakes unexpectedly produced a nutty flavor with no beany or cooked beany flavor in the mashed potatoes; while the addition of 40% untoasted flakes even though made from triple null soybeans gave a beany flavor and a cooked beany flavor, with some of the taste testers reporting a slight raw beany after taste. The relative flavors and flavor intensities were reported as follows on a scale of 0 to 6 (6 being the highest flavor intensity):

(1) for the untoasted soybean flakes a beany flavor intensity of about 1 and a cooked beany flavor intensity of about 5; and, (2) for the toasted soybean flakes (TSX02-M) a nutty flavor intensity of about 5.

The invention claimed is:

1. A composition for making soy protein enriched and soy oil containing mashed potato product comprising:
   (i) from 20 to 60% by weight toasted full fat, enzyme active soybean flakes made from full fat, enzyme active, dehulled soybeans, wherein the flakes have been toasted for a sufficient time and at a sufficient temperature to substantially reduce beany and off-flavors; and,
   (ii) from 80 to 40% by weight potato flakes.

2. The composition of claim 1 wherein the toasted full fat, enzyme active soybean flakes are prepared from soybean flakes made from full fat, enzyme active, dehulled soybeans, with substantially none of the fat/oil being removed during preparation of and subsequent toasting of the flakes, and in the composition contains about 40% toasted soybean flakes.

3. The composition of claim 2 wherein the soybean flakes have a thickness of about 0.2 mm.

4. The composition of claim 1 comprising:
   i) from 45 to 60% by weight toasted soybean flakes; and,
   ii) from 65 to 40% by weight potato flakes.

5. The composition of claim 4 wherein the soybean flakes have a thickness of about 0.2 mm.

6. The composition of claim 1, wherein the toasted full fat, enzyme active soybean flakes are prepared using soybean flakes made from full fat, enzyme active, dehulled hilum soybeans.

7. The composition of claim 1, wherein the toasted soybean flakes are made from soybean flakes prepared according to the method comprising:
   (i) brushing the soybeans;
   (ii) adjusting the water content of the soybeans to facilitate separation of the skin portion of the soybean from the flesh portion thereof;
   (iii) separating the skin portions of the soybeans from the flesh portions;
   (iv) simultaneous with separating dividing each flesh portion into four to eight flesh parts;
   (v) passing the flesh parts through flat-pressing rollers, whereby a product in the form of a mass of uniformly distributed flakes results; and,
   (vi) toasting the flakes for a sufficient time and at a sufficient temperature to substantially reduce beany and off-flavors.

8. The composition of claim 1, wherein the toasted soybean flakes are prepared from soybean flakes with have been quickly heated in a hot fluidizing gas for a time and at a temperature sufficient to substantially reduce beany and off-flavors, but insufficient to cause any substantial denaturing of the soy proteins.

9. The composition of claim 1 wherein the composition contains about 60% toasted soybean flakes prepared from soybean flakes made from full fat, enzyme active, dehulled soybeans.

10. The composition of claim 1 wherein the toasted soybean flakes are made from soybean flakes prepared from mechanically dehulled and processed soybeans.

11. The composition of claim 1 wherein the soybean flakes have a thickness of about 0.2 mm.

* * * * *